(12) United States Patent
Maresh et al.

(10) Patent No.: US 11,136,116 B2
(45) Date of Patent: Oct. 5, 2021

(54) ELASTOMERIC DOUBLE HOOKE'S JOINT

(71) Applicant: Bell Textron Inc., Fort Worth, TX (US)

(72) Inventors: Andrew Ryan Maresh, Lewisville, TX (US); Chyausong Tzeng, Arlington, TX (US); Russell Mueller, Coppell, TX (US)

(73) Assignee: Bell Textron Inc., Fort Worth, TX (US)

( * ) Notice: Subject to any disclaimer, the term of this patent is extended or adjusted under 35 U.S.C. 154(b) by 236 days.

(21) Appl. No.: 16/561,516

(22) Filed: Sep. 5, 2019

(65) Prior Publication Data

US 2021/0070432 A1    Mar. 11, 2021

(51) Int. Cl.
*B64C 27/41* (2006.01)
*B64C 27/35* (2006.01)
*B64C 27/12* (2006.01)

(52) U.S. Cl.
CPC .............. *B64C 27/35* (2013.01); *B64C 27/41* (2013.01); *B64C 2027/125* (2013.01); *F16C 2326/43* (2013.01); *F16C 2361/41* (2013.01)

(58) Field of Classification Search
CPC ... B64C 2027/125; B64C 27/35; B64C 27/37; B64C 27/41
See application file for complete search history.

(56) References Cited

U.S. PATENT DOCUMENTS

| | | | | |
|---|---|---|---|---|
| 6,712,313 B2 * | 3/2004 | Zoppitelli | ........... | B64C 29/0033 244/17.11 |
| 8,038,539 B2 * | 10/2011 | Stamps | ............... | B64C 29/0033 464/138 |
| 9,388,862 B2 * | 7/2016 | Lidak | ...................... | B64C 27/41 |
| 9,878,783 B2 * | 1/2018 | Sutton | ...................... | B64C 27/41 |

\* cited by examiner

*Primary Examiner* — Justin D Seabe
(74) *Attorney, Agent, or Firm* — Fogarty LLP (57) ABSTRACT

Embodiments are directed to a double Hooke's joint gimbal in a rotor system. An upper Hooke's joint has four arms extending radially outward to define first and second axes, and a lower Hooke's joint has four arms extending radially outward to define third and fourth axes. A pair of connectors couple the upper Hooke's joint and the lower Hooke's joint. A first set of bearings are positioned between arms on the upper and lower Hooke's joints and the connectors. The first set of bearings comprise an elastomer, such as elastomeric journal bearings. The upper Hooke's joint is coupled to a yoke and rotor blades by a driver assembly that allows rotor blade flapping. The lower Hooke's joint is coupled to and driven by a mast. A spherical bearing allows the upper Hooke's joint to move laterally along the mast.

20 Claims, 8 Drawing Sheets

ELASTOMERIC DOUBLE HOOKE'S JOINT

BACKGROUND

Rotor assemblies for rotary-wing aircraft, such as helicopters and tiltrotors, have many configurations. Existing tiltrotors, for example, may use a gimbaled hub, allowing the entire hub to gimbal relative to the mast during flapping while the blades remain in a fixed in-plane orientation relative to the hub. Other rotary-wing aircraft may use a single Hooke's joint. However, a 2P vibration problem can arise when using a Hooke's joint as a rotor gimbal. Such vibration is due to the lengthening and shortening of gimbal caused by flapping during rotation.

SUMMARY

Embodiments are directed to systems and methods for using a double Hooke's joint as a gimbal in a rotor system. In one embodiment, a rotor hub system comprises an upper Hooke's joint having four arms extending radially outward to define first and second axes, the upper Hooke's joint adapted to be coupled to a rotor system yoke; a lower Hooke's joint having four arms extending radially outward to define third and fourth axes, the lower Hooke's joint adapted to be coupled to a drive shaft; a pair of connectors, each coupled to an arm on the second axis of the upper Hooke's joint and to an arm on the fourth axis of the lower Hooke's joint; and a first set of bearings coupled to each arm on the second axis of the upper Hooke's joint and to each arm on the fourth axis of the lower Hooke's joint, wherein the first set of bearings comprise an elastomer.

The first set of bearings may comprise elastomeric journal bearings. The rotor hub system may further comprise a second set of bearings coupled to each arm on the first axis of the upper Hooke's joint and to each arm on the third axis of the lower Hooke's joint. The first set of bearings and the second set of bearings may be the same. Alternatively, the second set of bearings may comprise one or more of radial needle bearings and axial needle bearings.

The upper Hooke's joint may be coupled to the rotor system yoke by a driver assembly that is adapted to rotate about the arms on the first axis. The lower Hooke's joint may be coupled to the drive shaft by a mast connector that is adapted to rotate about arms on the third axis. The rotor hub system may further comprise a spherical bearing configured to allow the upper Hooke's joint to move laterally along a mast.

In another embodiment, a rotor assembly for a tiltrotor aircraft comprises a plurality of rotor blades coupled to a yoke, wherein the yoke coupled to a driver assembly that is configured to allow flapping of the rotor blades. A double Hooke's joint is coupled to the driver assembly. The double Hooke's joint comprises an upper Hooke's joint having four arms extending radially outward, a lower Hooke's joint having four arms extending radially outward, each of the arms on the lower Hooke's joint paired with an arm on the upper Hooke's joint, and two connectors, wherein each connector is coupled to a separate pair of arms on opposite sides of the upper Hooke's joint and the lower Hooke's joint. Connector arm bearings are coupled between each connector and associated arms on the upper Hooke's joint and the lower Hooke's joint. The bearings comprise an elastomer.

The double Hooke's joint may further comprise a drive shaft connector that is configured to couple the lower Hooke's joint to a drive shaft, and a spherical bearing configured to allow the upper Hooke's joint to move laterally along the drive shaft during operation. The drive shaft may be a mast that is in mechanical communication with a power source.

The rotor assembly may further comprise bearings coupled between two unrestricted arms on the upper Hooke's joint and the driver assembly and between two unrestricted arms on the lower Hooke's joint and the drive shaft connector. The unrestricted arms are not restricted by the connectors. The connector arm bearings may comprise elastomeric journal bearings, and the bearings on the unrestricted arms may comprise one or more of radial needle bearings and axial needle bearings.

In a further embodiment, a rotor hub system comprises an upper Hooke's joint configured to allow rotation about first and second axes, a yoke driver assembly coupled to the upper Hooke's joint, wherein the yoke driver assembly is configured to rotate around the first axis, a lower Hooke's joint configured to allow rotation about third and fourth axes, a mast connection coupled to the lower Hooke's joint, wherein the mast connection configured to rotate around the third axis, a connector configured to couple the upper Hooke's joint to the lower Hooke's joint to create a double Hooke's joint, and elastomeric material positioned between the connector and at least one of the upper Hooke's joint and the lower Hooke's joint.

The connector may comprise two sections, each section attaching to opposite sides of the upper Hooke's joint and the lower Hooke's joint. The connector may be configured to restrict the upper Hooke's joint from rotating about the first axis and to restrict the lower Hooke's joint from rotating about the third axis; however, the elastomeric material allows the upper Hooke's joint and/or the lower Hooke's joint to deflect toward each other about the first axis and/or third axis.

The rotor hub system may further comprise one or more bearings between the upper Hooke's joint and the connector, wherein the one or more bearings comprise the elastomeric material.

The rotor hub system may further comprise one or more bearings between the lower Hooke's joint and the connector, wherein the one or more bearings comprise the elastomeric material.

The rotor hub system may further comprise a spherical bearing configured to allow the upper Hooke's joint to float relative to a mast.

BRIEF DESCRIPTION OF THE DRAWINGS

Having thus described the invention in general terms, reference will now be made to the accompanying drawings, which are not necessarily drawn to scale, and wherein:

While the system of the present application is susceptible to various modifications and alternative forms, specific embodiments thereof have been shown by way of example in the drawings and are herein described in detail. It should be understood, however, that the description herein of specific embodiments is not intended to limit the system to the particular forms disclosed, but on the contrary, the intention is to cover all modifications, equivalents, and alternatives falling within the spirit and scope of the present application as defined by the appended claims.

DETAILED DESCRIPTION

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The present invention is directed to an apparatus and method for providing a gimbal for a rotor system using a double Hooke's joint. Two single Hooke's joints can be stacked together to create a double Hooke's joint. A center spherical bearing between the two Hooke's joints can float vertically along the rotor mast, thereby allowing the hub plane to slightly float and allowing lengthening or shortening as desired in the gimbal while flapping. The concept of a double Hooke's joint can be further improved in some embodiments by inserting elastomeric journal bearings into the rigid members in place of traditional needle bearings. By inserting this softness, the axial load generation in the gimbal bearings, which is the result of a desire for the bearings to reduce or lengthen their distance toward each other, can be completely eliminated. Eliminating this axial load allows for a significantly smaller package and allows for less weight.

Figure 1:
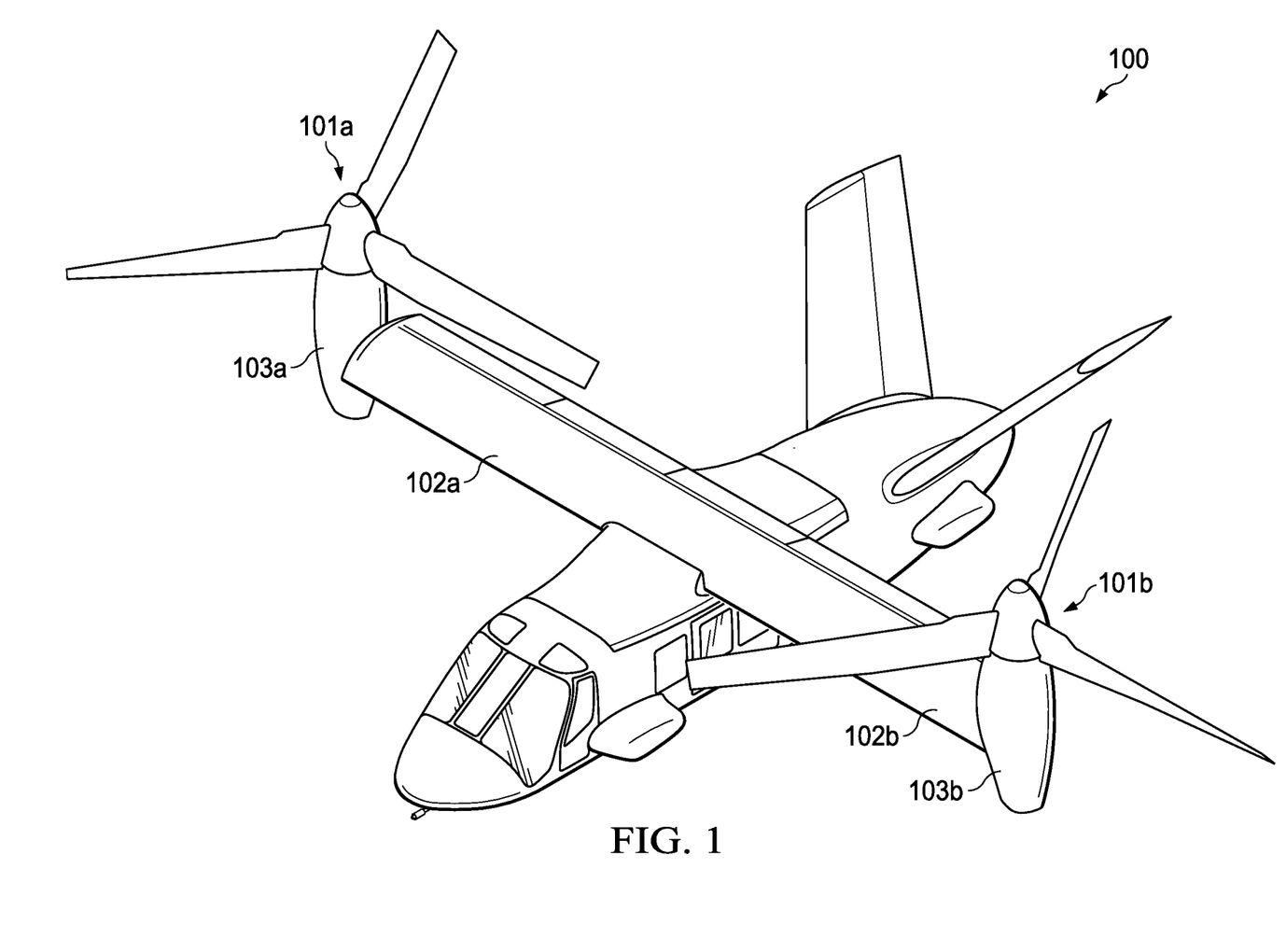
FIG. 1 depicts a tiltrotor aircraft utilizing embodiments in accordance with the present application.

FIG. 1 depicts a tiltrotor aircraft 100 utilizing embodiments of systems and methods in accordance with the present application. Tiltrotor aircraft 100 includes rotor assemblies 101a and 101b that are carried at the end portions of wings 102a and 102b, respectively. Rotor assemblies 101a and 101b include nacelles or pylons 103a and 103b that can house the engines and transmissions of tilt rotor aircraft 100. Alternatively, the engine and transmission could be housed in the center fuselage. Tilt rotor assemblies 101a and 101b move or rotate relative to wing members 102a and 102b between a helicopter or hover mode, wherein tilt rotor assemblies 101a and 101b are tilted upward, such that tilt rotor aircraft 100 flies like a conventional helicopter, and an airplane or cruise mode, wherein tilt rotor assemblies 101a and 101b are tilted forward, such that tilt rotor aircraft 100 flies like a conventional propeller-driven aircraft.

Figure 2:
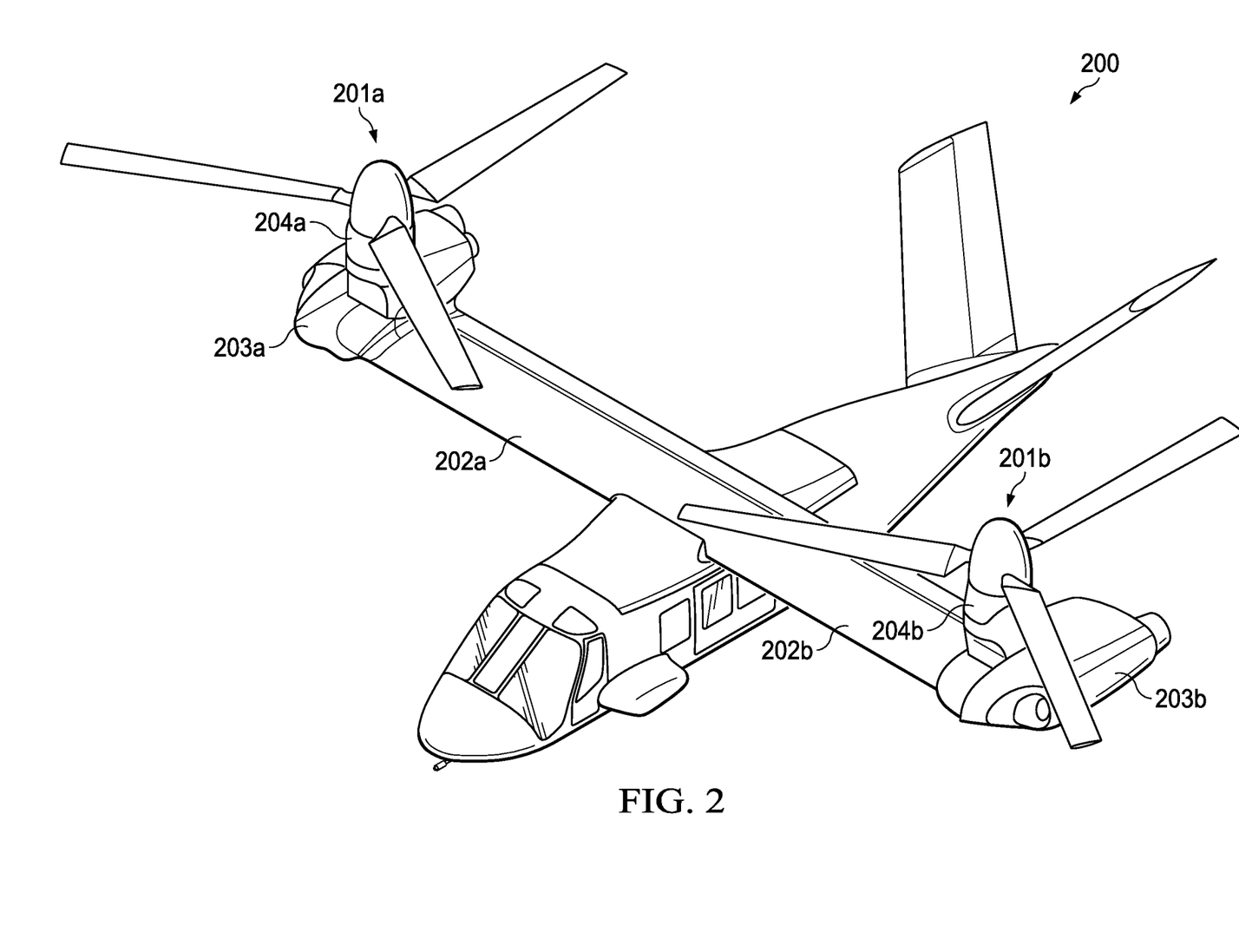
FIG. 2 depicts another tiltrotor aircraft utilizing embodiments in accordance with the present application.

FIG. 2 depicts another tiltrotor aircraft 200 that utilizes systems and methods in accordance with the present application. Tiltrotor aircraft 200 includes rotor assemblies 201a and 201b that are carried by wings 202a and 202b and are disposed at the end portions of wings 202a and 202b, respectively. Rotor assemblies 201a and 201b are rotatably coupled to nacelles 203a and 203b, which could include the engines and transmissions for tilt rotor aircraft 200. In this embodiment, the engines are fixed to the wing and do not rotate. Instead, only the pylons 204a and 204b rotate along with the rotor assemblies 201a and 201b. Tilt rotor assemblies 201a and 201b move and rotate relative to wing members 202a and 202b and the nacelles 203a and 203b. The nacelles 203a and 203b do not move relative to the wing members 202a and 202b. Instead, during the transition between a helicopter or hover mode and an airplane or cruise mode, only the pylons 204a and 204b to redirect the direction of thrust from the rotor assemblies 201a and 201b.

Designs of rotors and propellers for tiltrotor aircraft are often extremely complex. A large number of factors must be considered, including flexure of the rotor under heavy loads and the required motions of the rotor blades with respect to the drive mechanism. The considerations for proprotors, used as both propellers and rotors in aircraft such as tiltrotor aircraft 100 and 200, can be more complex than usual. Gimbaled rotors may be used in such aircraft. In a gimbaled rotor, joints must be provided between the driveshaft/mast that carries torque from the engine and the yoke that drives the blades, giving rise to a relatively complex hub assembly.

Figure 3:
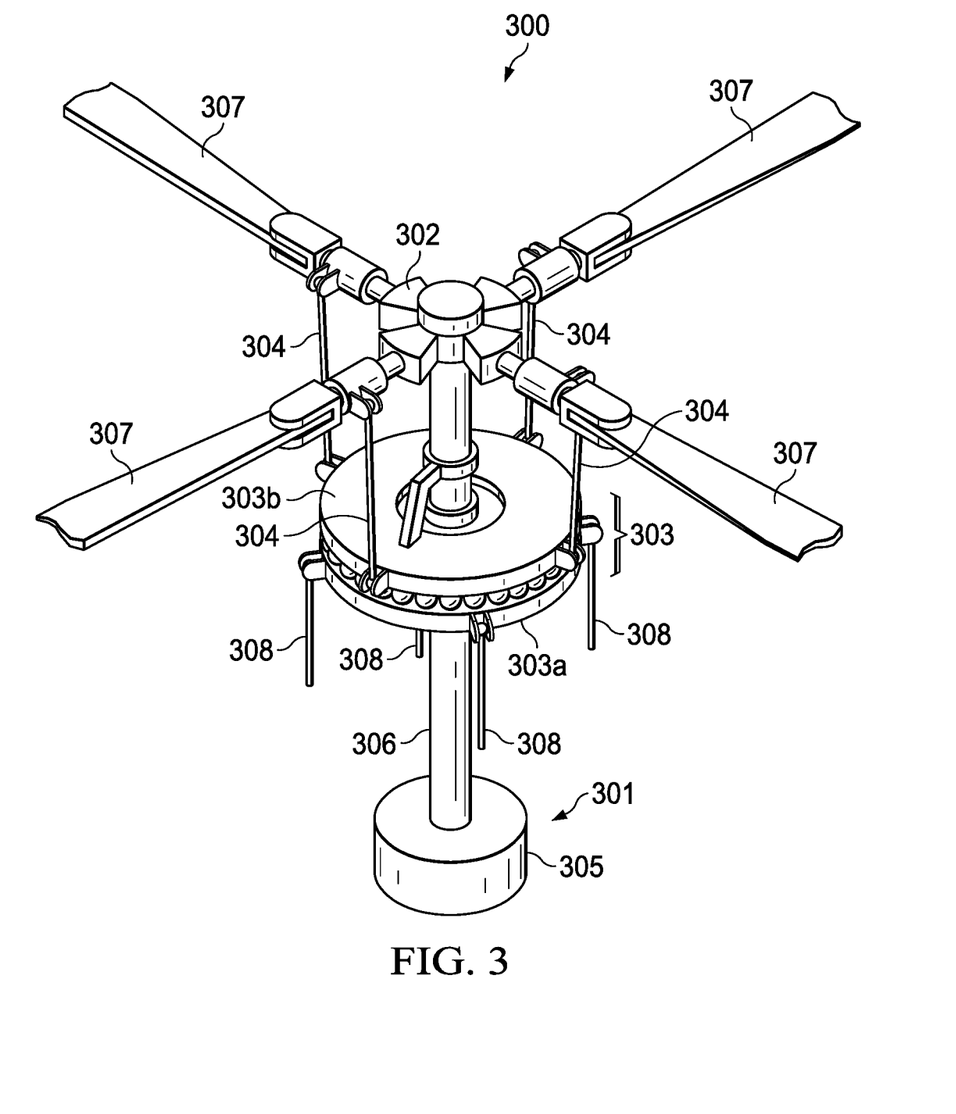
FIG. 3 illustrates a rotor system that may be used in an example embodiment.

FIG. 3 is a simplified diagram of a rotor system 300 that may be used for rotor assemblies 101a and 101b (FIG. 1) or rotor assemblies 201a and 201b (FIG. 2) according to an example embodiment. Rotor system 300 features a power train 301, a hub 302, a swashplate 303, and pitch links 304. In some examples, rotor system 300 may include more or fewer components, such as a gearbox, drive links, drive levers, and other components that may be incorporated. Power train 301 features a power source 305 and a mast 306. Power source 305, mast 306, and hub 302 are mechanical components for transmitting torque and/or rotation. Power train 301 may include a variety of components, including an engine, a transmission, and differentials. In operation, mast 306 receives torque or rotational energy from power source 305 and rotates hub 302. Rotation of rotor hub 302 causes blades 307 to rotate about mast 306.

Swashplate 303 translates rotorcraft flight control input into motion of blades 307. Because blades 307 are typically spinning when the rotorcraft is in flight, swashplate 303 may transmit flight control input from control links 308 to the hub 302, blades 307, and/or components coupling hub 302 to blades 307 (e.g., grips and pitch horns). Swashplate 303 may include a non-rotating swashplate ring 303a and a rotating swashplate ring 303b. Non-rotating swashplate ring 303a does not rotate with mast 306, whereas rotating swashplate ring 303b does rotate with mast 306. In the example of FIG. 3, pitch links 304 connect rotating swashplate ring 303b to blades 307.

In operation, according to an example embodiment, translating the non-rotating swashplate ring 303a along the axis of mast 306 causes the pitch links 304 to move up or down. This changes the pitch angle of all blades 307 equally, thereby increasing or decreasing the thrust of the rotor and causing the aircraft to ascend or descend. Tilting the non-rotating swashplate ring 303a causes the rotating swashplate ring 303b to tilt, moving the pitch links 304 up and down cyclically as they rotate with the drive shaft. This tilts the thrust vector of the rotor, causing the aircraft to translate horizontally following the direction the swashplate is tilted.

Mast 306 transmits torque to hub 302 using a gimble assembly that allows for blade 307 flapping. Blade flapping may generally refer to up-and-down motion of a rotor blade 307 during operation. When flapping occurs, blade 307 deviates upwards or downwards. Blade flapping may be caused by the changing speeds of a rotor blade 307 during one rotation. For a single-rotor aircraft, the rotor disc may be divided into two sides: the advancing blade side and the retreating blade side. On the advancing blade side, rotation of the rotor blade 307 causes the rotor blade 307 to move in the same direction as forward flight of the aircraft. On the retreating side, rotation of the rotor blade 307 causes the rotor blade to move in the opposite direction of forward flight of the aircraft. An advancing blade 307, upon meeting the progressively higher airspeeds brought about by the addition of forward flight velocity to the rotational airspeed of the rotor, respond to the increase of speed by producing more lift. This increased production of lift causes the blade 307 to flap (or lift) upwards. For a retreating blade 307, the opposite is true. The retreating blade 307 responds to the progressively lower airspeeds by producing less lift. This decreased production of lift causes the blade to flap downwards.

Hub 302 may be moved in a variety of positions relative to mast 306 due to flapping. Moving hub 302 relative to mast 306 may change the angular relationship between hub 302 and mast 306, which may cause hub 302 and mast 306 to phase shift. Hub 302 and mast 306 may phase shift, for example, if they are not maintained at constant velocity during rotation. In embodiments disclosed herein, a double Hooke's joint is used to connect the two rotating components—i.e., hub 302 and mast 306—that are operating at an angle to one another. This angle may vary during operation. The double Hooke's joint assembly disclosed herein mechanically couples the input (i.e., mast 306) to the output (i.e., hub 302 and the rotor assembly) in such a way that torque may be transmitted from the input to the output while maintaining a substantially constant angular velocity throughout a full rotation of the mast and rotors.

While the examples used in this disclosure refer to tiltrotor aircraft, it will be understood that a double Hooke's joint hub as described herein may also be used for other rotorcraft, such as helicopters and drones having one or more rotor masts in a generally fixed vertical configuration.

Figure 4:
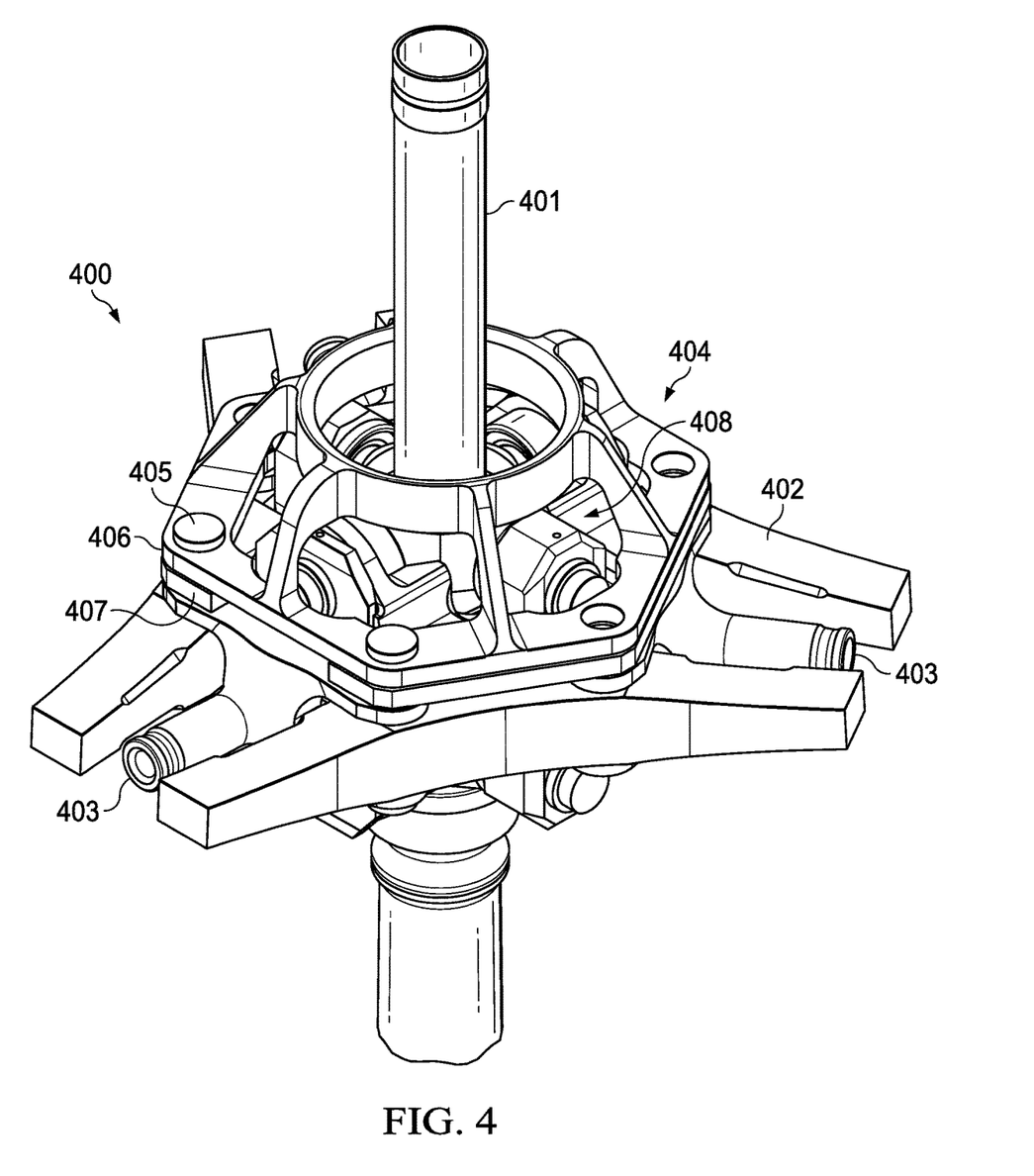
FIG. 4 is an isometric view showing a rotor hub assembly according to an example embodiment.
Figure 5:
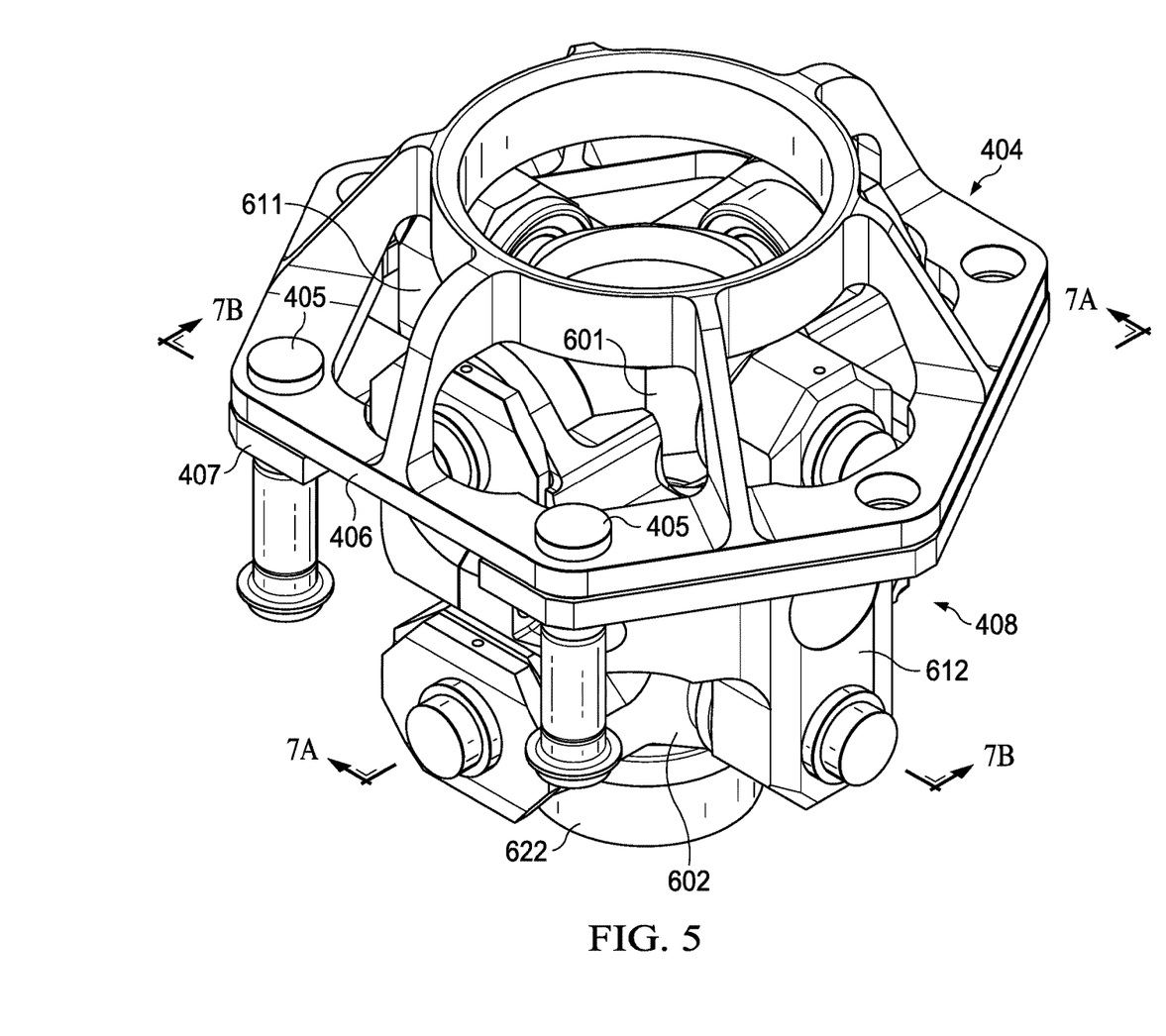
FIG. 5 is an isometric view showing additional detail of the rotor hub assembly.
Figure 6:
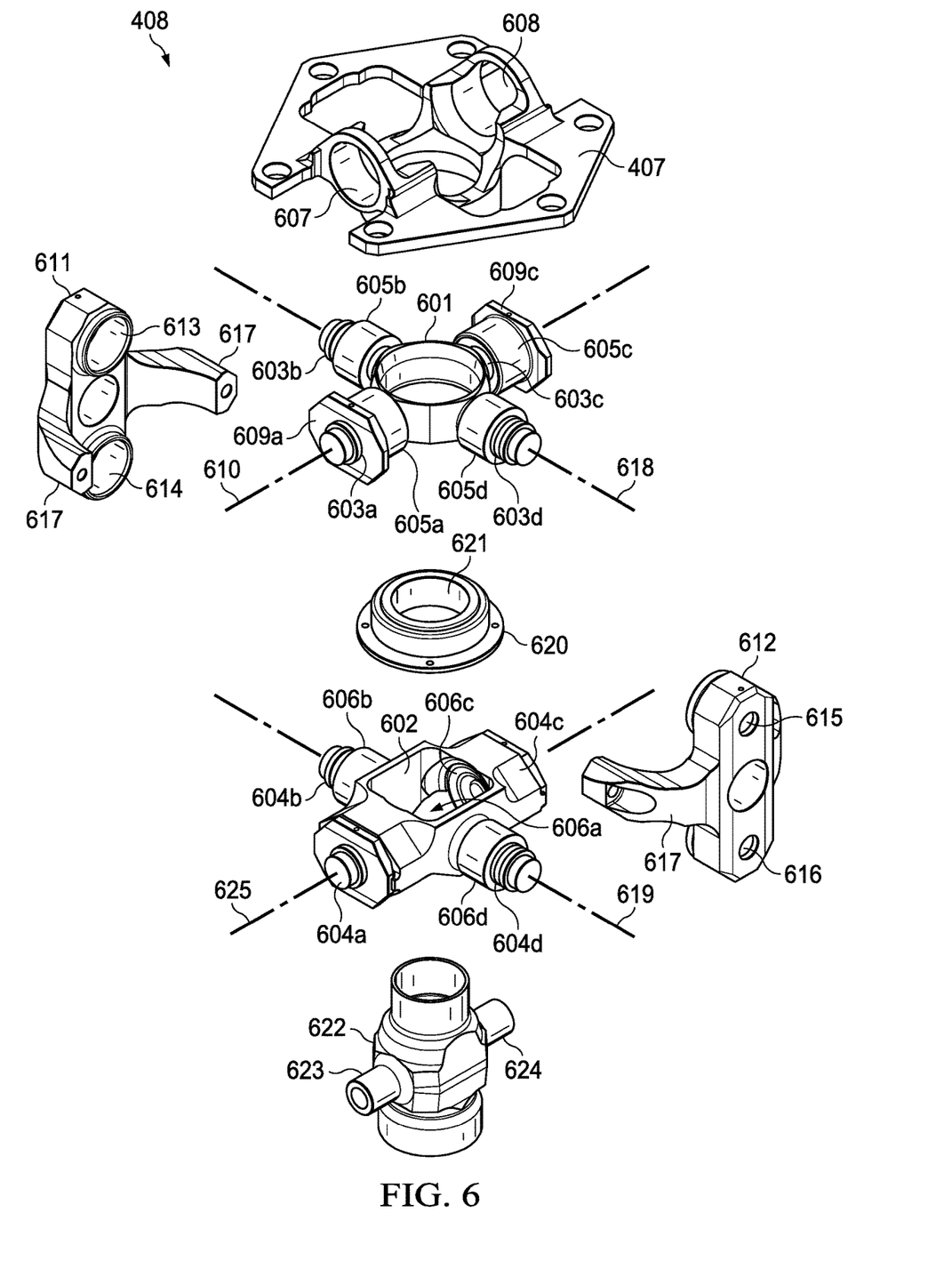
FIG. 6 shows an exploded view of the main components of a double Hooke's joint gimbal.

FIGS. 4, 5, and 6 depict components of a rotor hub assembly 400 having a double Hooke's joint according to an example embodiment. FIG. 4 is an isometric view showing rotor hub assembly 400 in relation to mast 401. FIG. 5 is an isometric view showing rotor hub assembly 400 without mast 401 and yoke 402. Mast 401 is coupled via a main rotor gearbox and/or other transmission gears to an engine. The engine causes mast 401 to rotate, which in turn rotates rotor hub assembly 400 and the aircraft's rotor blades (not shown). Rotor hub assembly 400 comprises a yoke 402 having three arms to which rotor blades can be coupled using spindles 403. Yoke 402 and spindles 403 are attached to driver assembly 404 by bolts 405. Driver assembly 404 comprises an upper section 406 and a lower section 407 in the illustrated embodiment. Although yoke 402 and spindles 403 are shown as attached below driver assembly 404 in FIG. 4, the yoke may be attached above or in line with driver assembly 404 in other embodiments. In other embodiments, driver assembly 404 may be incorporated into a yoke and/or may be any structure configured to attach a yoke for a rotor system to double Hooke's joint 408.

FIG. 6 shows an exploded view of the main components of double Hooke's joint 408 and lower driver assembly section 407. Double Hooke's joint 408 comprises two single Hooke's joints—upper Hooke's joint 601 and lower Hooke's joint 602. Each single Hooke's joint 601 and 602 is generally x-shaped and has four arms 603a-d and 604a-d positioned at right angles to each other. Each arm 603a-d and 604a-d has a corresponding bearing 605a-d or 606a-d that allows other components to rotate relative to the upper and lower single Hooke's joints 601 and 602. Bearings 606a and 606c are positioned within arms 604a and 604c, respectively, while the other bearings in the illustrated embodiment are mounted around the remaining arms of upper and lower single Hooke's joints 601 and 602.

The lower driver section 407 has openings 607 and 608 that are adapted to fit over arms 603a and 603c, respectively, of upper Hooke's joint 601. Caps 609a and 609c hold lower driver section 407 in place on arms 603a and 603c. Bearings 605a and 605c allow lower driver section 407 to rotate around axis 610 relative to upper Hooke's joint 601.

The upper and lower single Hooke's joints 601 and 602 are coupled together using rigid connectors 611 and 612. Channels 613 and 614 on rigid connector 611 are adapted to receive arm 603b and 604b, respectively, and channels 615 and 616 rigid connector 611 are adapted to receive arm 603d and 604d, respectively. Rigid connectors 611 and 612 are attached using arms 617, which may be bolted together or otherwise fixedly attached so that rigid connectors 611 and 612 do not separate and do not rotate relative to each other.

When upper and lower single Hooke's joints 601 and 602 are mounted within rigid connectors 611 and 612, bearings 605b and 605d allow upper Hooke's joint 601 to rotate around axis 618 relative to rigid connectors 611 and 612. Similarly, bearings 606b and 606d allow lower Hooke's joint 602 to rotate around axis 619 relative to rigid connectors 611 and 612.

A spherical bearing 620 is positioned between the upper and lower Hooke's joints 601 and 602. Spherical bearing 620 has a center opening 621 that is adapted to receive mast 401. During operation, spherical bearing 620 allows the double Hooke's joint assembly 408 to float relative to mast 401. In one embodiment, spherical bearing 620 may be attached to upper Hooke's joint 601, and, in other embodiments, spherical bearing 620 may be attached to lower connector 622.

Lower connector 622 is adapted to engage mast 401, such as by a female spline (not shown) on connector 622 that meshes with a male spline on mast 401. Lower connector 622 has two arms 623 and 624 that are configured to fit within arms 604a and 604c, respectively, of lower Hooke's joint 602. Bearings 606a and 606c allow lower connector 622 to rotate around axis 625 relative to lower Hooke's joint 602.

During operation, rotation of mast 401 drives rotation of lower connector 622, which then drives rotation of lower Hooke's joint 602. The rotation of lower Hooke's joint 602 is transferred to upper Hooke's joint 601 by rigid connectors 611 and 612. In turn, rotation of upper Hooke's joint 601 causes rotation of lower driver section 407, which then rotates the rotor blades attached to yoke 402 and splines 403. Double Hooke's joint assembly 408 allows driver assembly 404 and the rotor disk to flap relative to mast 401 during rotation.

Figure 7A:
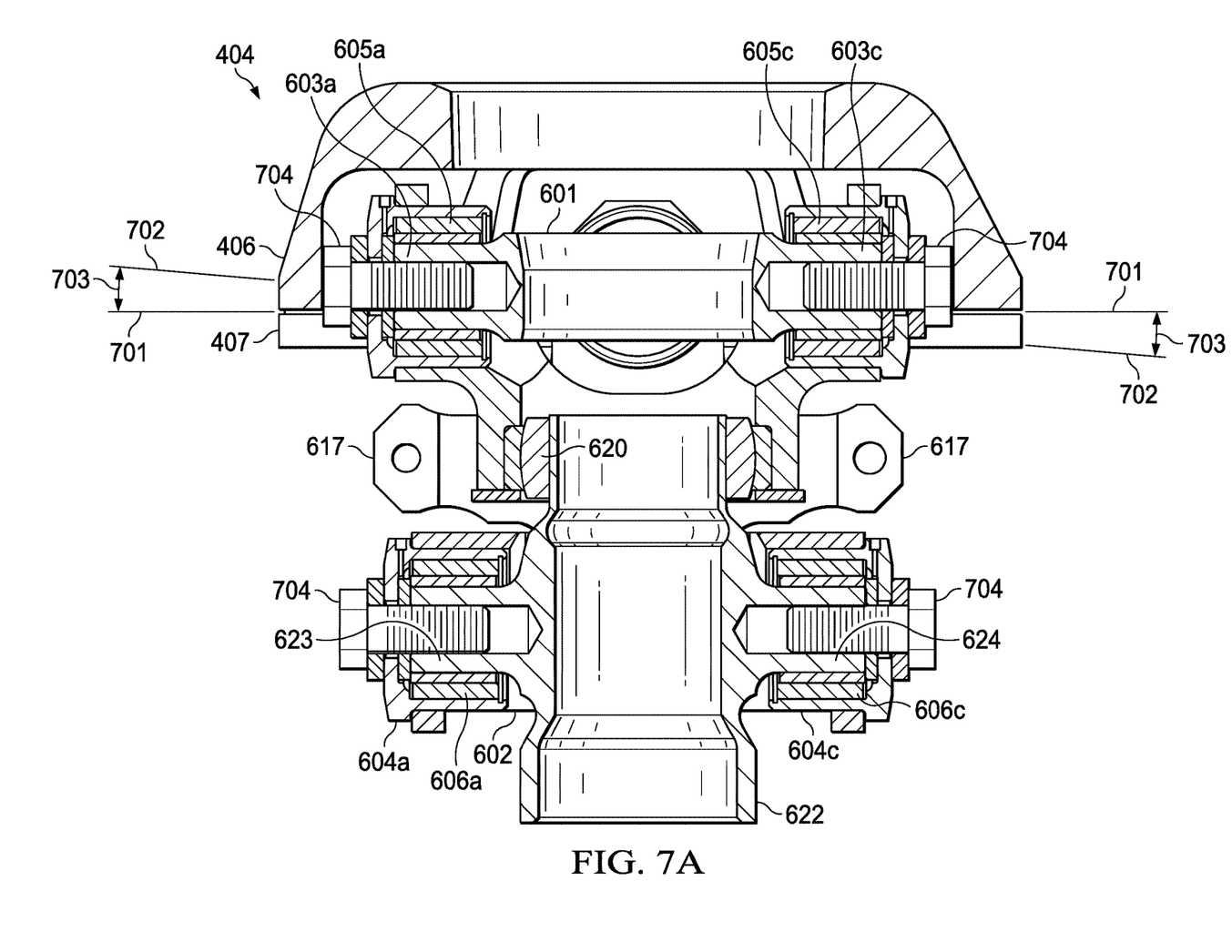
FIGS. 7A and 7B are cross-section views through the bearings of a double Hooke's joint assembly.
Figure 7B:
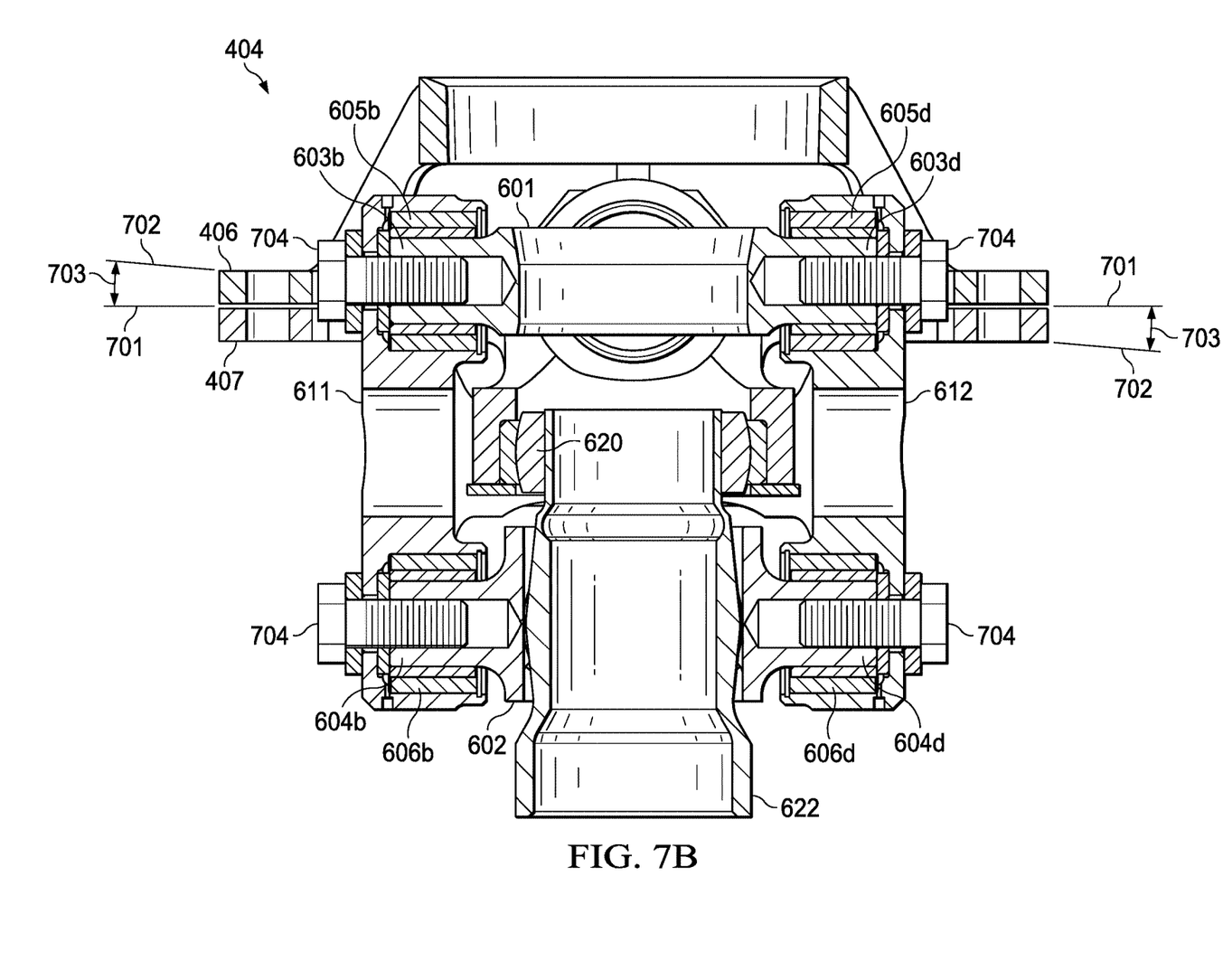

FIGS. 7A and 7B are cross-section views through the bearings 605a-d and 606a-d of double Hooke's joint assembly 408. Flapping may cause driver assembly 404 (and the rotor blades attached thereto) to rotate out of level plane 701 to tilted position 702 by an angle 703. When driver assembly 404 is flapping during rotation of double Hooke's joint assembly 408, the flapping causes upper single Hooke's joint 601 to tilt or bend relative to lower single Hooke's joint 602. The float from spherical bearing 620 allows this tilting.

Referring to FIG. 7A, flapping causes arms 603c and 604c to move toward each other thereby shortening their distance and causes arms 603a and 604a to move away from each other thereby lengthening their distance. Bearings 605a, 605c, 606a, and 606c may be, for example, one or more radial needle bearings and/or axial (thrust) needle bearings to support the include axial load on arms 603a, 603c, 604a, and 604c. Bolts 704 hold the bearings on each arm.

Referring now to FIG. 7B, flapping generates forces that attempt to move arms 603d and 604d toward each other thereby shortening their distance and attempt to move arms 603b and 604b away from each other thereby lengthening their distance. However, rigid connectors 611 and 612, which are required to couple upper and lower single Hooke's joints 601 and 602 together, resist relative movement between arms 603b and 604b and between arms 603d and 604d. Bearings 605b and 606b are fixed within rigid connector 611, and bearings 605d and 606d are fixed within rigid connector 612. Because they cannot move relative to each other, arms 603b and 604b and between arms 603d and 604d generate a substantial axial load. In one embodiment of the double Hooke's joint assembly 408, bearings 605b, 605d, 606b and 606d comprise, at least in part, elastomers. For example, bearings 605b, 605d, 606b and 606d may comprise elastomeric journal bearing, which eliminates the need for additional axial components to handle the load caused by rigid connectors 611 and 612 during flapping. In other embodiments, the elastomeric bearings may be used either alone or in combination with radial needle bearings and/or axial (thrust) needle bearings. The use of elastomers in bearings 605b, 605d, 606b and 606d allows arms 603b and 604b and arms 603d and 604d, respectively, to move relative to each other.

In another embodiment, an elastomer may be used in rigid connectors 611 and 612 to allow for compression in connectors 611 and 612, which would permit arms 603b and 604b and arms 603d and 604d, respectively, to move relative to each other. Rigid connectors 611 and 612 may comprise an elastomer in or around one or more of the channels 613-616 that are adapted to receive arms 603b, 604b, 603d, and/or 604d. Alternatively, or in addition, an elastomer may be incorporated in the construction of rigid connectors 611 and 612, such as a band of elastomeric material in the middle of each connector 611 and 612.

In an example embodiment, a rotor hub system comprises an upper Hooke's joint configured to allow rotation about first and second axes, a yoke driver assembly coupled to the upper Hooke's joint, the yoke driver assembly configured to rotate around the first axis, a lower Hooke's joint configured to allow rotation about third and fourth axes, a mast connection coupled to the lower Hooke's joint, the mast connection configured to rotate around the third axis, a connector configured to couple the upper Hooke's joint to the lower Hooke's joint to create a double Hooke's joint, and elastomeric material positioned between the connector and at least one of the upper Hooke's joint and the lower Hooke's joint.

The connector may comprise two sections, wherein each section attaches to opposite sides of the upper Hooke's joint and the lower Hooke's joint. The connector may be configured to restrict the upper Hooke's joint from rotating about the first axis and to restrict the lower Hooke's joint from rotating about the third axis. The elastomeric material may allow the upper Hooke's joint and/or the lower Hooke's joint to deflect toward each other about the first axis and/or third axis.

The rotor hub system may further comprise one or more bearings between the upper Hooke's joint and the connector, wherein the one or more bearings comprise the elastomeric material.

The rotor hub system may further comprise one or more bearings between the lower Hooke's joint and the connector, wherein the one or more bearings comprise the elastomeric material.

The rotor hub system may further comprise a spherical that is bearing configured to allow the upper Hooke's joint to float relative to a mast.

In another embodiment, a rotor hub system comprises an upper Hooke's joint having four arms that extend radially outward to define first and second axes, a lower Hooke's joint having four arms that extend radially outward to define third and fourth axes, a pair of connectors, each connector coupled to an arm on the second axis of the upper Hooke's joint and to an arm on the fourth axis of the lower Hooke's joint, and a first set of bearings coupled to each arm on the second axis of the upper Hooke's joint and to each arm on the fourth axis of the lower Hooke's joint, wherein the first set of bearings comprise an elastomer. The first set of bearings may comprise elastomeric journal bearings. The upper Hooke's joint may be adapted to be coupled to a rotor system yoke, and the lower Hooke's joint may be adapted to be coupled to a drive shaft. The upper Hooke's joint may be coupled to the rotor system yoke by a driver assembly that is adapted to rotate about the arms on the first axis. The lower Hooke's joint may be coupled to the drive shaft by a mast connector that is adapted to rotate about arms on the third axis.

The rotor hub system may further comprise a second set of bearings that are coupled to each arm on the first axis of the upper Hooke's joint and to each arm on the third axis of the lower Hooke's joint. The first set of bearings and the second set of bearings may have the same design or construction.

In further embodiments, the second set of bearings may comprise one or more radial needle bearings and/or axial needle bearings.

In further embodiments, the first set of bearings may also comprise one or more radial needle bearings and/or axial needle bearings.

The rotor hub system may further comprise a spherical bearing that is configured to allow the upper Hooke's joint to move laterally along a mast.

In another embodiment, a rotor assembly for a tiltrotor aircraft comprises a plurality of rotor blades coupled to a yoke, wherein the yoke is coupled to a driver assembly that is configured to allow flapping of the rotor blades, and a double Hooke's joint coupled to the driver assembly. The double Hooke's joint may comprise an upper Hooke's joint having four arms extending radially outward, a lower Hooke's joint having four arms extending radially outward, wherein each of the arms on the lower Hooke's joint are paired with an arm on the upper Hooke's joint, two connectors, wherein each connector is coupled to a separate pair of arms on opposite sides of the upper Hooke's joint and the lower Hooke's joint, and connector arm bearings coupled between each connector and the associated arms on the upper Hooke's joint and the lower Hooke's joint, the bearings comprising an elastomer.

The double Hooke's joint may further comprise a drive shaft connector that is configured to couple the lower Hooke's joint to a drive shaft, and a spherical bearing configured to allow the upper Hooke's joint to move laterally along the drive shaft during operation. The drive shaft may be a mast that is in mechanical communication with a power source.

The rotor assembly may further comprise bearings coupled between two unrestricted arms on the upper Hooke's joint and the driver assembly and between two unrestricted arms on the lower Hooke's joint and the drive shaft connector, where the unrestricted arms are not restricted by the connectors.

The connector arm bearings may comprise elastomeric journal bearings, and the unrestricted-arm bearings may comprise one or more of radial needle bearings and axial needle bearings.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

What is claimed is:

1. A rotor hub system, comprising:
    an upper Hooke's joint configured to allow rotation about first and second axes;
    a yoke driver assembly coupled to the upper Hooke's joint, the yoke driver assembly configured to rotate around the first axis;
    a lower Hooke's joint configured to allow rotation about third and fourth axes;
    a mast connection coupled to the lower Hooke's joint, the mast connection configured to rotate around the third axis;
    a connector configured to couple the upper Hooke's joint to the lower Hooke's joint to create a double Hooke's joint; and
    elastomeric material positioned between the connector and at least one of the upper Hooke's joint and the lower Hooke's joint.

2. The rotor hub system of claim 1, wherein the connector comprises two sections, each section attaching to opposite sides of the upper Hooke's joint and the lower Hooke's joint.

3. The rotor hub system of claim 1, wherein the connector is configured to restrict the upper Hooke's joint from rotating about the first axis and to restrict the lower Hooke's joint from rotating about the third axis; and wherein the elastomeric material allows the upper Hooke's joint and/or the lower Hooke's joint to deflect toward each other about the first axis and/or third axis.

4. The rotor hub system of claim 1, further comprising:
    one or more bearings between the upper Hooke's joint and the connector, wherein the one or more bearings comprise the elastomeric material.

5. The rotor hub system of claim 1, further comprising:
    one or more bearings between the lower Hooke's joint and the connector, wherein the one or more bearings comprise the elastomeric material.

6. The rotor hub system of claim 1, further comprising:
    a spherical bearing configured to allow the upper Hooke's joint to float relative to a mast.

7. A rotor hub system, comprising:
    an upper Hooke's joint having four arms extending radially outward to define first and second axes, the upper Hooke's joint adapted to be coupled to a rotor system yoke;
    a lower Hooke's joint having four arms extending radially outward to define third and fourth axes, the lower Hooke's joint adapted to be coupled to a drive shaft;
    a pair of connectors, each coupled to an arm on the second axis of the upper Hooke's joint and to an arm on the fourth axis of the lower Hooke's joint; and
    a first set of bearings coupled to each arm on the second axis of the upper Hooke's joint and to each arm on the fourth axis of the lower Hooke's joint, wherein the first set of bearings comprise an elastomer.

8. The rotor hub system of claim 7, wherein the first set of bearings comprise elastomeric journal bearings.

9. The rotor hub system of claim 7, further comprising:
    a second set of bearings coupled to each arm on the first axis of the upper Hooke's joint and to each arm on the third axis of the lower Hooke's joint.

10. The rotor hub system of claim 9, wherein the first set of bearings and the second set of bearings are the same.

11. The rotor hub system of claim 9, wherein the second set of bearings comprises one or more of radial needle bearings and axial needle bearings.

12. The rotor hub system of claim 7, wherein the first set of bearings further comprises one or more of radial needle bearings and axial needle bearings.

13. The rotor hub system of claim 7, wherein the upper Hooke's joint is coupled to the rotor system yoke by a driver assembly that is adapted to rotate about the arms on the first axis.

14. The rotor hub system of claim 7, wherein the lower Hooke's joint is coupled to the drive shaft by a mast connector that is adapted to rotate about arms on the third axis.

15. The rotor hub system of claim 7, further comprising:
    a spherical bearing configured to allow the upper Hooke's joint to move laterally along a mast.

16. A rotor assembly for a tiltrotor aircraft, comprising:
    a plurality of rotor blades coupled to a yoke;
    the yoke coupled to a driver assembly that is configured to allow flapping of the rotor blades; and
    a double Hooke's joint coupled to the driver assembly, the double Hooke's joint comprising:
        an upper Hooke's joint having four arms extending radially outward;
        a lower Hooke's joint having four arms extending radially outward, each of the arms on the lower Hooke's joint paired with an arm on the upper Hooke's joint;
        two connectors, each connector coupled to a separate pair of arms on opposite sides of the upper Hooke's joint and the lower Hooke's joint; and connector arm bearings coupled between each connector and the associated arms on the upper Hooke's joint and the lower Hooke's joint, the bearings comprising an elastomer.

17. The rotor assembly of claim 16, wherein the double Hooke's joint further comprises:
a drive shaft connector that is configured to couple the lower Hooke's joint to a drive shaft; and
a spherical bearing configured to allow the upper Hooke's joint to move laterally along the drive shaft during operation.

18. The rotor assembly of claim 17, further comprising:
unrestricted-arm bearings coupled between two arms on the upper Hooke's joint and the driver assembly and between two arms on the lower Hooke's joint and the drive shaft connector.

19. The rotor assembly of claim 18, wherein the connector arm bearings comprise elastomeric journal bearings, and wherein the unrestricted-arm bearings comprise one or more of radial needle bearings and axial needle bearings.

20. The rotor assembly of claim 17, wherein the drive shaft is a mast in mechanical communication with a power source.

* * * * *